United States Patent
Nagano

(10) Patent No.: US 11,460,900 B2
(45) Date of Patent: Oct. 4, 2022

(54) VIDEO DISPLAY APPARATUS AND METHOD FOR SUPPLYING ELECTRIC POWER

(71) Applicant: NEC Display Solutions, Ltd., Tokyo (JP)

(72) Inventor: Yuta Nagano, Tokyo (JP)

(73) Assignee: Sharp NEC Display Solutions, Ltd., Tokyo (JP)

(*) Notice: Subject to any disclaimer, the term of this patent is extended or adjusted under 35 U.S.C. 154(b) by 0 days.

(21) Appl. No.: 16/961,146

(22) PCT Filed: Mar. 14, 2018

(86) PCT No.: PCT/JP2018/009925
§ 371 (c)(1),
(2) Date: Jul. 9, 2020

(87) PCT Pub. No.: WO2019/176003
PCT Pub. Date: Sep. 19, 2019

(65) Prior Publication Data
US 2020/0371573 A1  Nov. 26, 2020

(51) Int. Cl.
*G06F 1/26* (2006.01)
*G06F 1/3234* (2019.01)
(Continued)

(52) U.S. Cl.
CPC ............ *G06F 1/266* (2013.01); *G06F 1/3218* (2013.01); *G06F 1/3265* (2013.01);
(Continued)

(58) Field of Classification Search
CPC ... G06F 1/26; G06F 1/266; G06F 1/28; G06F 1/30; G06F 1/32; G06F 1/3203;
(Continued)

(56) References Cited

U.S. PATENT DOCUMENTS 9,134,779 B2 * 9/2015 Kuesel .................... G06F 1/26
10,976,798 B2 * 4/2021 Basterash ............. H02J 7/0042
(Continued)

FOREIGN PATENT DOCUMENTS

JP  2008-145679 A  6/2008
JP  2013-143081 A  7/2013
(Continued)

OTHER PUBLICATIONS

"Description JP2018029028A". Patent Translate. European Patent Office. Jun. 2, 2021. (Year: 2021).*
(Continued)

*Primary Examiner* — Thomas J. Cleary
(74) *Attorney, Agent, or Firm* — McGinn IP Law Group, PLLC

(57) ABSTRACT

A video display apparatus includes a power source that supplies first electric power and supplies second electric power that is different from the first electric power to an external device, a current detector that detects a current value when the second electric power is supplied to the external device, an electric power supply controller that includes a plurality of electric power supply modes and performs control that supplies electric power corresponding to one electric power supply mode among the plurality of electric power supply modes to the external device as the second electric power, and a controller that performs control that limits the first electric power when the current value detected by the current detector reaches a predetermined first threshold value.

18 Claims, 5 Drawing Sheets

(51) Int. Cl.
*G06F 11/30* (2006.01)
*G06F 1/3218* (2019.01)
*G06F 13/40* (2006.01)
*G06F 13/42* (2006.01)
*H02J 7/00* (2006.01)

(52) U.S. Cl.
CPC ...... *G06F 11/3058* (2013.01); *G06F 13/4022* (2013.01); *G06F 13/4282* (2013.01); *G06F 2213/0042* (2013.01); *H02J 7/0042* (2013.01)

(58) Field of Classification Search
CPC .... G06F 1/3206; G06F 1/3215; G06F 1/3234; G06F 1/3265; G06F 1/3296; G06F 11/3058; G06F 13/4022; G06F 13/4282; G06F 2213/0042; G06F 1/3218; H02J 7/0042
See application file for complete search history.

(56) References Cited

U.S. PATENT DOCUMENTS

| | | | | |
|---|---|---|---|---|
| 2006/0117195 | A1* | 6/2006 | Niwa | G06F 1/266 |
| | | | | 713/300 |
| 2007/0096562 | A1* | 5/2007 | Bainbridge | H02M 3/156 |
| | | | | 307/35 |
| 2007/0245161 | A1* | 10/2007 | Shaw | G06F 1/3203 |
| | | | | 713/300 |
| 2010/0097030 | A1* | 4/2010 | Kim | G06F 1/266 |
| | | | | 320/106 |
| 2010/0115296 | A1* | 5/2010 | Inoue | G06F 1/266 |
| | | | | 713/300 |
| 2012/0023345 | A1* | 1/2012 | Naffziger | G06F 1/324 |
| | | | | 713/320 |
| 2012/0139474 | A1* | 6/2012 | Cho | H02J 7/0047 |
| | | | | 320/106 |
| 2013/0038990 | A1* | 2/2013 | Chen | G06F 1/26 |
| | | | | 361/679.01 |
| 2014/0129856 | A1* | 5/2014 | Bertin | G06F 1/325 |
| | | | | 713/320 |
| 2014/0201542 | A1* | 7/2014 | Kommrusch | G06F 1/30 |
| | | | | 713/300 |
| 2014/0208140 | A1* | 7/2014 | Brooks | G06F 1/28 |
| | | | | 713/320 |
| 2015/0380924 | A1* | 12/2015 | Ohwaki | H02H 3/0935 |
| | | | | 361/93.7 |
| 2017/0017283 | A1* | 1/2017 | Seo | G06F 1/266 |
| 2017/0345361 | A1* | 11/2017 | Choi | G06F 3/147 |
| 2017/0358947 | A1* | 12/2017 | Waters | H02J 13/00016 |
| 2018/0120910 | A1* | 5/2018 | Farkas | G06F 1/266 |
| 2019/0041931 | A1* | 2/2019 | Bedare | G06F 1/26 |
| 2019/0086727 | A1* | 3/2019 | Dibbad | H05B 45/397 |

FOREIGN PATENT DOCUMENTS

| | | |
|---|---|---|
| JP | 2015-174375 A | 10/2015 |
| JP | 2015-176442 A | 10/2015 |
| JP | 2018-029028 A | 2/2018 |

OTHER PUBLICATIONS

"If," Merriam-Webster.com Dictionary. Merriam-Webster. Retrieved from Internet Jan. 14, 2022. <https://www.merriam-webster.com/dictionary/if> (Year: 2022).*

"When," Merriam-Webster.com Dictionary. Merriam-Webster. Retrieved from Internet Jan. 14, 2022. <https://www.merriam-webster.com/dictionary/when> (Year: 2022).*

International Search Report (ISR) (PCT Form PCT/ISA/210), in PCT/JP2018/009925, dated May 1, 2018.

* cited by examiner

| VBUS ELECTRIC POWER | VBUS CURRENT | | | |
|---|---|---|---|---|
| | VBUS VOLTAGE = 5V | VBUS VOLTAGE = 9V | VBUS VOLTAGE = 15V | VBUS VOLTAGE = 20V |
| ELECTRIC POWER ≤ 15W | (ELECTRIC POWER/5) A | | | |
| 15W < ELECTRIC POWER ≤ 27W | 3A | (ELECTRIC POWER/9) A | | |
| 27W < ELECTRIC POWER ≤ 45W | 3A | 3A | (ELECTRIC POWER/15) A | |
| 45W < ELECTRIC POWER ≤ 100W | 3A | 3A | 3A | (ELECTRIC POWER/20) A |

VIDEO DISPLAY APPARATUS AND METHOD FOR SUPPLYING ELECTRIC POWER

TECHNICAL FIELD

The present invention relates to a video display apparatus and a method for supplying electric power.

BACKGROUND ART

In recent years, the number of systems in which a video display apparatus (a source device) uses a Universal Serial Bus (USB) Type-C connector (hereinafter referred to as a USB connector) to connect to an external device (a sink device), videos are output from the external device to the video display apparatus, data is transmitted and received between the external device and the video display apparatus, and the video display apparatus provides supply from its power source to the external device is increasing (see, for example, Patent Document 1 with respect to a connection between a source device and a sink device).

Here, source devices and sink devices relate to supply of electric power that is performed among a plurality of electronic devices, and electronic devices that supply electric power are referred to as source devices and electronic devices to which electric power is supplied are referred to as sink devices.

It is to be noted that with respect to supply of video signals, electronic devices that supply video signals may be referred to as source devices and electronic devices to which video signals are supplied may be referred to as sink devices, but the following description will focus on supply of electric power.

When a video display apparatus is connected to an external device using a USB cable and the video display apparatus provides supply from its power source (supplies electric power) as described above, if the external device attempts to flow a current that exceeds a value determined by negotiations, the video display apparatus stops the supply of electric power in order to protect the apparatus.

Here, the negotiations are a process that is performed between a source device and a sink device in the USB Power Delivery (supply of electric power using a USB Type-C connector) in accordance with a USB protocol, in which information relating to electric power (voltage•current) that can be supported by the source device and the sink device is transmitted and received and supplying or supplied electric power (voltage•current) is determined. Then, supply of electric power in accordance with the determined electric power (voltage•current) is started.

PRIOR ART DOCUMENT

Patent Document

Patent Document 1: Japanese Unexamined Patent Application, First Publication No. 2015-174375

SUMMARY OF THE INVENTION

Problems to be Solved by the Invention

If the supply of electric power is stopped by the video display apparatus as described above, an apparatus (an electronic device) to which the electric power is supplied may be unable to operate properly. Moreover, if the supply of electric power is stopped by the video display apparatus, there is a problem in that data communications using a USB 3.1 and the output of the videos from the external device are also stopped in accordance with the specification of the USB Power Delivery. Although the capacity of supplying electric power of a video display apparatus can be increased in order to solve this problem, there is a problem in that it is necessary to design a power source circuit having a large capacity in order to increase the capacity of supplying electric power and thus the volume of the apparatus itself also increases.

An example object of the present invention is to provide a video display apparatus and a method for supplying electric power that are capable of solving the above problems.

Means for Solving the Problems

In order to solve the above problems, an example aspect of the present invention is a video display apparatus that includes: a power source unit that supplies first electric power and supplies second electric power that is different from the first electric power to an external device; a current detection unit that detects a current value when the second electric power is supplied to the external device; an electric power supply control unit that includes a plurality of electric power supply modes and performs control that supplies electric power corresponding to one electric power supply mode among the plurality of electric power supply modes to the external device as the second electric power; and a control unit that performs control that limits the first electric power when the current value detected by the current detection unit reaches a predetermined first threshold value.

Moreover, an example aspect of the present invention is a method for supplying electric power of a video display apparatus that includes a power source unit that supplies first electric power and supplies second electric power that is different from the first electric power to an external device, and the method includes: providing a plurality of electric power supply modes and supplying electric power corresponding to one electric power supply mode among the plurality of electric power supply modes to the external device as the second electric power; detecting a current value when the second electric power is supplied to the external device; and performing control that limits the first electric power when the detected current value reaches a predetermined first threshold value.

Example Advantages of the Invention

With the example aspects of the present invention, it is possible to continuously supply the electric power to the external device without increasing the supply capacity of the power source in the power source unit.

MODES FOR CARRYING OUT THE INVENTION

Figures 1, 2:
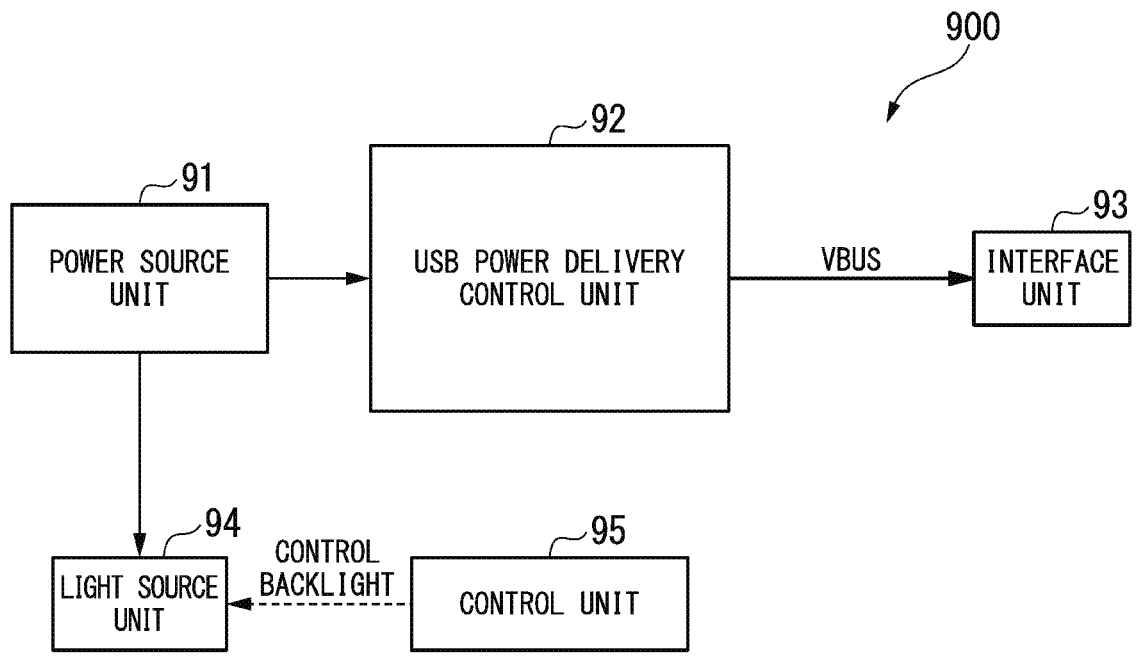
FIG. 1 is a block diagram showing an example of the structure of a conventional video display apparatus.
FIG. 2 is a diagram showing an example of settings of supply of electric power (electric power supply modes), for example, settings of supply of electric power of the USB Power Delivery.

Hereinafter, a conventional video display apparatus, its problems, and example embodiments of the present invention will be described in order with reference to the drawings. First of all, FIG. 1 is a block diagram showing an example of the structure of a conventional video display apparatus.

A video display apparatus 900 is configured to include a power source unit 91, a USB Power Delivery control unit (hereinafter referred to as an electric power supply control unit) 92, an interface unit 93, a light source unit 94, and a control unit 95.

In FIG. 1, the solid arrows show a power source flow (a flow of electric power) and the dashed arrow shows a signal flow (a flow of control signals).

The power source unit 91 supplies first electric power to the light source unit 94 and supplies second electric power to a sink device, which is an external device.

The electric power supply control unit 92 controls the power source unit 91 to supply the second electric power VBUS to the sink device through the interface unit 93. Here, the interface unit 93 includes a connector. The connector is, for example, a USB connector. A USB connector is a connector adapted to the USB Type-C standard. One end of the interface unit 93 is connected to the electric power supply control unit 92 and the other end of the interface unit 93 is connected to a cable, to which the sink device is connected. The cable is, for example, a USB cable and is a cable adapted to the USB Type-C standard. The USB cable is provided with a VBUS line (a bus power supply line) that supplies the second electric power VBUS, a plurality of signal lines (which are not shown in the drawings) used for transmitting and receiving VBUS electric power information (supplying information and supplied information relating to electric power supply modes), video signals, and so forth, and a ground line, which is also not shown in the drawings. Moreover, the USB cable may also be provided with, for example, other signal lines.

FIG. 2 is a diagram showing an example of settings of supply of electric power (electric power supply modes), for example, settings of supply of electric power of the USB Power Delivery. For example, when supply electric power using the VBUS is set to 15 W (watt) or less and a VBUS voltage is equal to 5 V (volt), a VBUS current is set to (electric power/5) A (ampere).

The VBUS electric power information (VBUS voltage information, VBUS current information) includes information indicating VBUS voltages and VBUS currents shown in FIG. 2. The electric power supply control unit 92 is an apparatus that supplies VBUS electric power, the VBUS electric power information, and so forth to the sink device. The sink device is, for example, a notebook-type personal computer (hereinafter referred to as a notebook personal computer) and supplies video signals to the electric power supply control unit 92.

The electric power supply control unit 92 transmits and receives signals through the interface unit 93. For example, when the electric power supply control unit 92 is connected to a notebook personal computer, which is a sink device, through the interface unit 93, the electric power supply control unit 92 executes predetermined negotiations (transmission and reception of the electric power information and determination of the electric power information) with the notebook personal computer. That is, the electric power supply control unit 92 transmits the VBUS electric power information, which is output by the video display apparatus 900 serving as a source device. Moreover, the electric power supply control unit 92 outputs the transmitted VBUS electric power information to the power source unit 91 and controls the power source unit 91 so that the power source unit 91 outputs the second electric power VBUS.

The light source unit 94 is provided with, for example, a plurality of LEDs that are arranged in a straight line as a light source. The light source unit 94 receives an input of the first electric power output by the power source unit 91, turns on the plurality of LEDs using the first electric power as a power source, and emits a backlight. The light source unit 94 is provided with, for example, optical members such as a light guide plate and optical sheets and irradiates the backlight emitted by the plurality of LEDs to the back surface of an image display unit, which is not shown in FIG. 1, through the optical members. Moreover, the light source unit 94 is provided with, for example, a plurality of switches and irradiates the backlight to the back surface of the image display unit by turning on or turning off the plurality of switches on the basis of a backlight control signal input from the control unit 95. The image display unit receives the backlight emitted by the light source unit 94 through its back surface and controls the transmittance of the backlight using liquid crystal to thereby, for example, display an image corresponding to a video signal that has been processed by a video processing circuit (not shown in the drawings) that performs predetermined processing such as change of the resolution and adjustment of the image quality on a video signal input from the outside.

The control unit 95 refers to information that is stored in, for example, a built-in memory on the basis of information indicating the first electric power, which is supplied from the power source unit 91 to the light source unit 94, generates the backlight control signal, and outputs the backlight control signal to the light source unit 94. The backlight control signal is a control signal by which the light source unit 94 turns on (connects) or turns off (disconnects) the above-described plurality of switches provided in the light source unit 94. The memory built in the control unit 95 stores, for example, a table that associates the information indicating the first electric power with the on/off states of the switches.

The structure of the conventional video display apparatus 900 has been described above, and its problems will be described below.

In the supply of electric power (the USB Power Delivery) using the USB connector (the interface unit 93), negotiations are performed between a source device and a sink device in accordance with the USB protocol, a voltage and current that can be supported by the source device and the sink device are determined and then the supply of electric power is started. However, some sink devices attempt to flow a current having a value that exceeds the current value determined by the negotiations. That is, a situation in which the current supplied from a source device to a sink device exceeds the current value determined by the negotiations may arise.

If an excessive current flows when the second electric power VBUS is supplied to the sink device, the USB Power Delivery control unit (the electric power supply control unit 92) of the video display apparatus 900, which is a source device, stops the supply of electric power in order to protect the apparatus. If the supply of electric power is stopped, data communications using a USB 3.1 and the output of videos from the external device are also stopped in accordance with the specification of the USB Power Delivery.

The USB Power Delivery supporting devices (the devices that support the USB Power Delivery: source devices and sink devices) must store the range of the voltages that are supported by the USB Power Delivery supporting devices and currents corresponding to the voltages in advance. When USB Power Delivery supporting devices are connected to each other, a sink device selects a desired voltage from among the voltages that are supported by a source device and requests, from the source device, a required current value within the range of the currents that the source device can supply when the desired voltage is used.

For example, in the case of a video display apparatus that is designed to allocate 30 W (watt) for supply of electric power using a USB connector (the USB Type-C), when the video display apparatus follows the settings of supply of electric power of the USB Power Delivery shown in FIG. 2, with respect to (voltage, current), it is essential to support (5 V (volt), 3 A (ampere)), (9 V, 3 A), and (15 V, 2 A (=30 W/15 V)) and it is optional to support (20 V, 1.5 A (=30 W/20 V)).

Moreover, in the case of a video display apparatus that is designed for 45 W, it is essential to support (5 V, 3 A), (9 V, 3 A), and (15 V, 3 A) and it is optional to support (20 V, 2.25 A (=45 W/20 V)).

Furthermore, in the case of a video display apparatus that is designed for 50 W, it is essential to support (5 V, 3 A), (9 V, 3 A), (15 V, 3 A), and (20 V, 2.5 A (=50 W/20 V)).

In this manner, with respect to notebook personal computers that are assumed to connect to video display apparatuses, many devices require a voltage of 20 V, and thus it is desirable for video display apparatuses that serve as source devices to support an optional 20 V.

Moreover, notebook personal computers serving as sink devices often require supply of electric power of approximately (20 V, 2 A). When a notebook personal computer is connected to a video display apparatus that is capable of supplying electric power up to 30 W, (20 V, 1.5 A) is established by the negotiations. However, when the notebook personal computer, which is a sink device, is a device that is incapable of limiting the current to 1.5 A, the device may attempt to flow a current up to 2 A required by the device itself, which exceeds 1.5 A established by the negotiations. In this case, the video display apparatus, which is a source of electric power, activates a function of protecting the power source and stops the supply of electric power.

Although the capacity of supplying electric power of the video display apparatus can be increased in order to solve this problem, there is a problem in that it is necessary to design a power source circuit (the power source unit 91) having a large capacity in order to increase the capacity of supplying electric power and thus the volume of the apparatus itself also increases.

In order to solve this problem, the video display apparatus in accordance with the present example embodiment is provided with a current detection circuit, and if a sink device attempts to flow a current that exceeds the value determined by negotiations, when a control unit (a control unit) detects a current close to a threshold value at which a power source protecting function of the electric power supply control unit (a USB Power Delivery control unit) built in the video display apparatus, which is a source device, is activated, the control unit limits the electric power of the backlight (a light source unit) of the video display apparatus and at the same time raises the electric power that can be supplied using the USB Type-C. Moreover, if necessary, negotiations are performed again. As a result, the threshold value of the protection function of the electric power supply control unit is increased, and thus it is possible to prevent the supply of electric power from being stopped and continuously supply the electric power without increasing the supply capacity of the power source in the power source unit. Next, a video display apparatus in accordance with an example embodiment of the present invention in order to solve the problem will be described.

FIRST EXAMPLE EMBODIMENT

Figure 3:
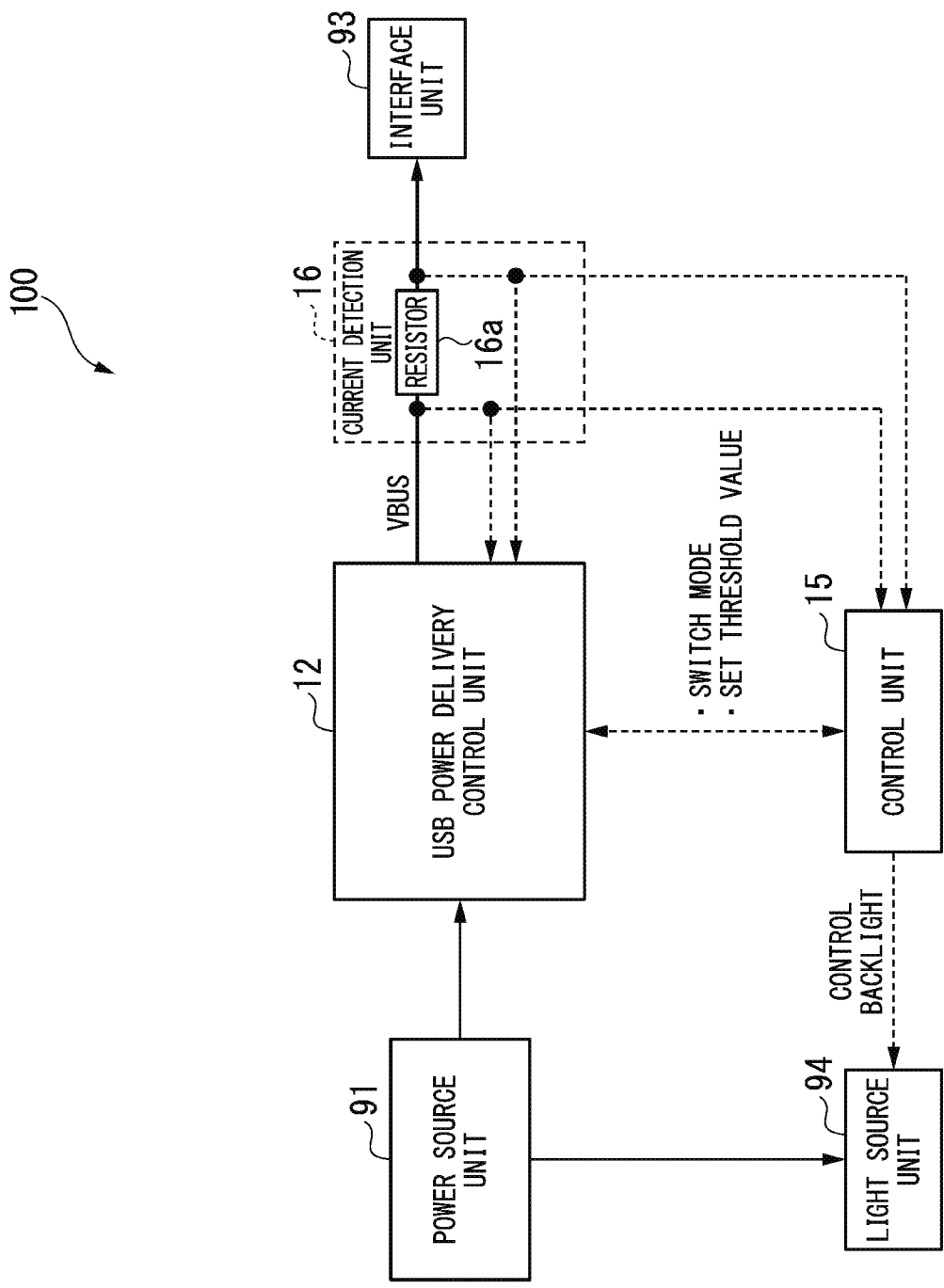
FIG. 3 is a block diagram showing an example of the structure of a video display apparatus in accordance with an example embodiment of the present invention.

FIG. 3 is a block diagram showing an example of the structure of a video display apparatus in accordance with an example embodiment of the present invention.

In FIG. 3, the same reference signs are assigned to the same parts as those of the video display apparatus shown in FIG. 1 and a description thereof is omitted.

A video display apparatus 100 is configured to include a power source unit 91, a USB Power Delivery control unit (hereinafter referred to as an electric power supply control unit) 12, an interface unit 93, a light source unit 94, a control unit 15, and a current detection unit 16.

In FIG. 3, the solid arrows indicate a power source flow (a flow of electric power) and the dashed arrows indicate a signal flow (a flow of control signals).

The electric power supply control unit 12 is provided with a plurality of electric power supply modes and performs control that supplies the electric power corresponding to one electric power supply mode among the plurality of electric power supply modes to the sink device, which is an external device, as the second electric power VBUS.

Moreover, prior to starting supply of the second electric power with respect to a predetermined electric power supply mode among the plurality of electric power supply modes, the electric power supply control unit 12 may negotiate with the sink device, which is an external device, in advance and may determine a supply voltage when the second electric power is supplied.

It is to be noted that with respect to an electric power supply mode, a plurality of supply voltages and a plurality of current values (reference current values, supply current values) corresponding to the plurality of supply voltages when the second electric power is supplied are provided, as shown in FIG. 2.

Here, the negotiations are a process that is performed between a source device and a sink device in the USB Power Delivery (USB electric power supply, supply of electric power using a USB Type-C connector) in accordance with a USB protocol, in which information relating to electric power (voltage•current) that can be supported by the source device and the sink device is transmitted and received and supplying or supplied electric power (voltage•current) is determined.

That is, the negotiations are a process in which an apparatus (an electronic device) that supplies electric power and an apparatus (an electronic device) to which electric power is supplied transmit and receive information relating to supplying or supplied electric power (e.g., voltages, currents, and/or electric power that are supported by the apparatuses themselves, voltages, currents, and/or electric power that are suitable to the apparatuses themselves, or the like), and the apparatus that supplies electric power or the apparatus to which electric power is supplied appropriately determines a supplying or supplied voltage, current, and/or electric power.

Focusing on the apparatus (the electronic device) that supplies electric power, the negotiations are a process in which the electric power supply control unit 12 transmits supplying information relating to an electric power supply mode to an external device, receives supplied information relating to the electric power supply mode from the external device, and determines at least a supply voltage when second electric power is supplied on the basis of the received supplied information.

It is to be noted that the supplying information includes at least information indicating a plurality of supply voltages (voltage values) and current values (reference current values, supply current values) corresponding to the plurality of supply voltages (the voltage values) that are provided for an electric power supply mode, and the supplied information includes at least information indicating one supply voltage (a voltage value) among the plurality of supply voltages included in the supplying information.

Moreover, the electric power corresponding to an electric power supply mode is electric power when a current having a value less than a set current value flows, a current having a value less than a first threshold value flows, or a current having a value less than a second threshold value flows. That is, the electric power (e.g., 30 W) indicated by an electric power supply mode indicates reference electric power when electric power is to be supplied, and electric power less than that electric power (30 W), for example, 15 W (=5 V×3 A) or electric power less than or equal to 30 W (a variable supply voltage that is less than or equal to 20 V and a variable supply current that is less than or equal to 1.5 A) may be supplied. Moreover, electric power that reaches the first threshold value or the second threshold value that are greater than that electric power (30 W) may be supplied. It is to be noted that the details of the first threshold value and the second threshold value will be described later.

The current detection unit 16 detects a current value when the second electric power VBUS is supplied to the sink device. Specifically, the current detection unit 16 is configured with, for example, a resistor 16a in which one end is connected to the electric power supply control unit 12 and the other end is connected to the interface unit 93. The current detection unit 16 divides the voltage value across the resistor 16a by the resistance of the resistor 16a to detect the current value when the second electric power VBUS is supplied.

It is to be noted that although the current detection unit 16 detects the current value using the resistor 16a, detection of the current value is not limited thereto. For example, another structure that detects the current value when the second electric power VBUS is supplied, for example, a structure that detects the current value by detecting a magnetic field generated by a current flow may be used.

When the current value detected by the current detection unit 16 reaches a predetermined first threshold value, the electric power supply control unit 12 performs control that changes one electric power supply mode among the plurality of electric power supply modes to another electric power supply mode in which the amount of supply of electric power is increased.

Moreover, when the current value detected by the current detection unit 16 reaches a predetermined second threshold value that is greater than the predetermined first threshold value, the electric power supply control unit 12 performs control that stops the supply of the second electric power.

When the current value detected by the current detection unit 16 reaches the predetermined first threshold value, the control unit 15 performs control that limits the electric power supplied to the light source unit 94. The predetermined first threshold value is a value greater than a reference current value (a supply current value) that is set for the current supply mode determined by performing negotiations. In other words, the predetermined first threshold value is a value greater than a current value (the supply current value) that corresponds to a supply voltage when the second electric power is supplied. With this operation, it is possible to, for example, reduce an excessive burden on the power source unit 91.

In the present example embodiment, the electric power supply control unit 12 is provided with a 30 W mode (a normal mode, a first mode) in which reference electric power of 30 W (watt) is supplied and a 45 W mode (a backlight limitation mode, a second mode) in which reference electric power of 45 W is supplied, as the plurality of electric power supply modes.

That is, when the video display apparatus 100 is designed to allocate 30 W for supply of electric power using a USB Type-C connector, a mode (the normal mode) in which (5 V (volt), 3 A (ampere)), (9 V, 3 A), (15 V, 2 A), and (20 V, 1.5 A) as shown FIG. 2 can be supplied as combinations of (voltage, current) corresponding to electric power that can be supplied in the USB Power Delivery is stored in the USB Power Delivery control unit (the electric power supply control unit 12). Moreover, as another mode (the backlight limitation mode), the electric power for the backlight (a light source) is reduced by 15 W, and a mode (the backlight limitation mode) in which (5 V, 3 A), (9 V, 3 A), (15 V, 3 A), and (20 V, 2.25 A) as shown in FIG. 2 can be supplied as combinations of (voltage, current) by which electric power of 45 W can be supplied is also stored.

That is, a plurality of supply voltages (voltage values) and current values (reference current values, supply current values) corresponding to the plurality of supply voltages (the voltage values) are provided for the plurality of electric power supply modes. Information indicating the plurality of voltage values and the current values corresponding to the plurality of voltage values is an example of the supplying information. Reference supply electric power (voltage, current) of 30 W is an example of first supply electric power, and 45 W is an example of second supply electric power. The value of the second supply electric power is set to a value greater than that of the first supply electric power. In other words, the electric power supply amount of the second supply electric power is greater than that of the first supply electric power.

Moreover, predetermined threshold values for current are determined as the following first threshold value and second threshold value. Then, the control unit 15 has the first threshold value, and the USB Power Delivery control unit (the electric power supply control unit 12) has the second threshold value.

The first threshold value (a threshold value at which the mode is changed from the 30 W mode to the 45 W mode) is set to 120% of the current value determined by negotiations.

Here, the current value determined by negotiations is 1.5 A as will be described below, and thus the first threshold value is 1.8 A (=1.5 A×1.2).

The second threshold value (a threshold value at which the electric power supply control unit 12 activates a current protection function to stop supply of current) is set to 130% of the current value determined by negotiations.

Here, the current value determined by re-negotiations is 2.25 A as will be described below, and thus the second threshold value is 2.925 A (=2.25 A×1.3).

Figure 4:
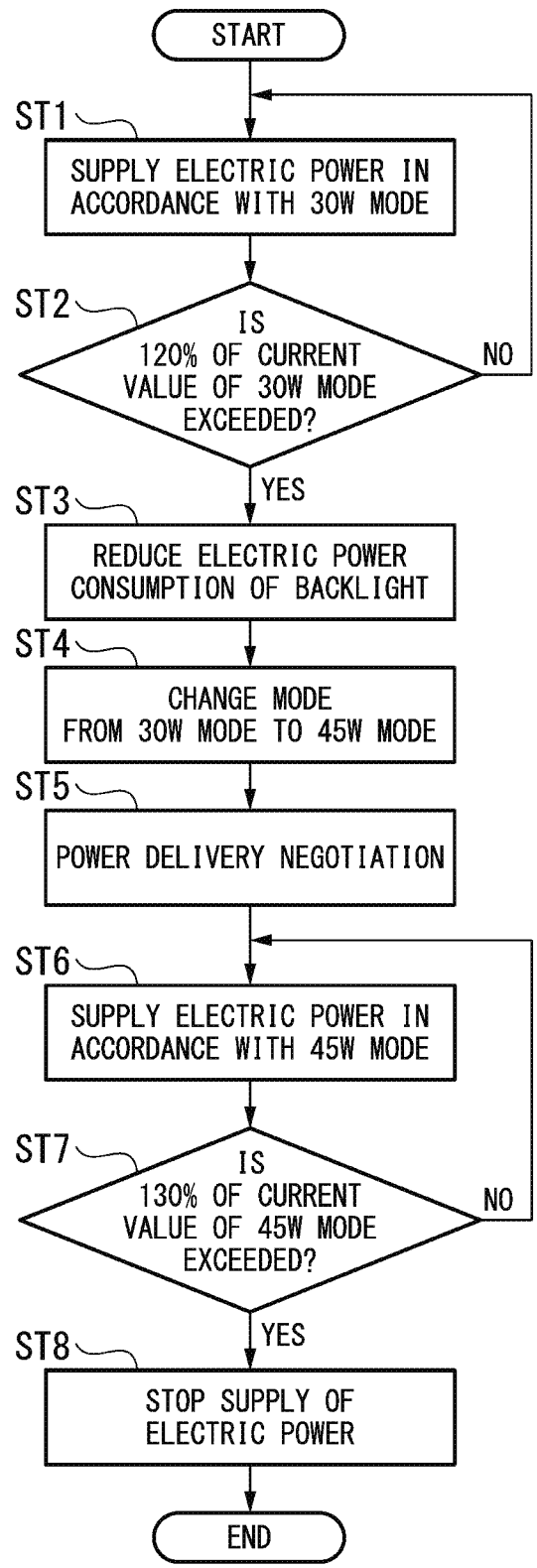
FIG. 4 is a flowchart showing an example of the operation of a video display apparatus 100 shown in FIG. 3.

FIG. 4 is a flowchart showing an example of the operation of the video display apparatus 100 shown in FIG. 3.

Because the video display apparatus 100 has a supply capacity up to 30 W in the normal mode, when a notebook personal computer that requires a maximum electric power of 40 W (20 V, 2 A) is connected to the interface unit 93 of the video display apparatus 100 as a sink device, the supply electric power VBUS is established as 30 W (20 V, 1.5 A) as a result of negotiations. The result of the negotiations is also communicated to the control unit 15 and the first threshold value is set to 1.8 A.

At this time, if the notebook personal computer, which is a sink device, is a device that is incapable of following the current value determined by the negotiations, the notebook personal computer attempts to flow a current up to a maximum value of 2 A required by the notebook personal computer itself. When the control unit 15 detects that the current value reaches 1.8 A, which is 120% of 1.5 A determined by the negotiations, the functions of the present invention are activated. FIG. 4 shows the flow thereof.

The electric power supply control unit 12 executes supply of electric power to the notebook personal computer, which is a sink device, in accordance with the 30 W mode (step ST1). Specifically, the electric power supply control unit 12 controls the power source unit 91 having an electric power supply capacity of 60 W so that the power source unit 91 supplies supply electric power VBUS of 30 W (20 V, 1.5 A) to the notebook personal computer connected to the interface unit 93 as the second electric power and supplies electric power of 30 W (60 W−30 W=30 W) to the light source unit 94 as the first electric power. It is to be noted that in order to simplify the description, the description assumes that an electric power supply capacity is a capacity that can supply the electric power obtained by summing the first electric power and the second electric power and an electric power supply capacity does not include the electric power supplied to the other electric circuits and so forth provided in the video display apparatus 100.

Here, the negotiations will be specifically described. The electric power supply control unit 12 is provided with the 30 W mode and the 45 W mode as the electric power supply modes, and the electric power supply control unit 12 transmits information (supplying information) of the 30 W mode ((5 V, 3 A), (9 V, 3 A), (15 V, 2 A), and (20 V, 1.5 A)) that is set in advance as a basic setting (an initial setting) to the sink device. Having received the information of the 30 W mode, the sink device transmits a voltage and current (supplied information) that are supported by the sink device itself or a voltage and current (supplied information) that are suitable to the sink device itself, for example, (20 V, 1.5 A) among the information to the electric power supply control unit 12 of the video display apparatus 100 (the sink device transmits a request). Having received the information (the supplied information) on the voltage and current supported by the sink device or the voltage and current suitable to the sink device (the request), the electric power supply control unit 12 determines (accepts) the requested voltage and current (20 V, 1.5 A) and performs a setting so that the determined voltage and current (20 V, 1.5 A) can be supplied. That is, the electric power supply control unit 12 determines the 30 W mode (20 V, 1.5 A) as an electric power supply mode.

It is to be noted that although it is assumed that in the negotiations, the sink device transmits the information indicating the voltage and current (20 V, 1.5 A) to the video display apparatus 100, information indicating the current (1.5 A) may not be transmitted and information indicating the voltage (20 V) may be transmitted to the video display apparatus 100.

Moreover, it is assumed that the power source unit 91 has an electric power supply capacity of 60 W, the first threshold value is set to 120% of the current value determined by the negotiations, and the second threshold value is set to 130% of the current value determined by the negotiations; however, it is desirable to set the second threshold value to a value that is less than a value by which at least the power source unit 91 does not cause abnormalities such as destruction, and it is desirable to set the first threshold value to a value that is greater than the current value determined by the negotiations (a maximum value set for the supply current) and that is less than the second threshold value. Moreover, the first threshold value and the second threshold value may be set in accordance with, for example, a different criteria for a different electric power supply mode or for a different supply voltage, rather than percentages relative to the current value determined by the negotiations (the reference current value). Furthermore, the power source unit 91 may have an electric power supply capacity that is greater than 60 W and may supply electric power to the other electric circuits and so forth provided in the video display apparatus 100.

The control unit 15 determines whether or not the current value detected by the current detection unit 16 exceeds 120% (the first threshold value) of the current value (current=1.5 A) of the 30 W mode (determines whether or not the current value reaches 120%) (step ST2).

If the control unit 15 has determined that the current value does not exceed 1.8 A, which is 120% of the current value of the 30 W mode (No at step ST2), the electric power supply control unit 12 continues execution of the supply of electric power to the notebook personal computer, which is a sink device, in accordance with the 30 W mode (step ST1).

In contrast, if the control unit 15 has determined that the current value exceeds 1.8 A, which is 120% of the current value of the 30 W mode (Yes at step ST2), the control unit 15 executes control that reduces the current consumption of the backlight (step ST3). Specifically, the control unit 95 generates a backlight control signal on the basis of information indicating the first electric power supplied from the power source unit 91 to the light source unit 94 (15 W obtained by subtracting 15 W from 30 W) and outputs the backlight control signal to the light source unit 94.

Subsequently, the electric power supply control unit 12 executes a change from the 30 W mode to the 45 W mode (step ST4). Specifically, the electric power supply control unit 12 controls the power source unit 91 so that the power source unit 91 supplies 15 W to the light source unit 94 as the first electric power and supplies 45 W to the sink device, which is an external device, as the second electric power VBUS. More specifically, the electric power supply control unit 12 controls the power source unit 91 so that the power source unit 91 changes the mode to the 45 W mode and supplies electric power using the supply voltage (20 V) determined in the previous negotiations.

Subsequently, the electric power supply control unit 12 executes negotiations relating to the Power Delivery (step ST5). Specifically, the electric power supply control unit 12 execute re-negotiations with the sink device, which is an external device, and determines to change the second electric power VBUS that can be supplied from 30 W to 45 W (20 V, 2.25 A).

Specifically, in the re-negotiations, the electric power supply control unit 12 transmits information of the 45 W mode ((5 V, 3 A), (9 V, 3 A), (15 V, 3 A), and (20 V, 2.25 A)) to the sink device as an electric power supply mode. Having received the information of the 45 W mode, the sink device transmits a voltage and current that are supported by the sink device itself or a voltage and current that are suitable to the sink device itself, for example, (20 V, 2.25 A), among the information to the electric power supply control unit 12 of the video display apparatus 100 (the sink device transmits a request). Having received the information on the voltage and current that are supported by the sink device (the request), the electric power supply control unit 12 determines (accepts) the requested voltage and current (20 V, 2.25 A) and performs a setting so that the determined voltage and current (20 V, 2.25 A) can be supplied.

It is to be noted that when (5 V, 3 A) of the 30 W mode is set as a result of the negotiations, even if the mode is changed to the 45 W mode, (5 V, 3 A) may be set as in the 30 W mode. For this reason, when reference current values in different electric power supply modes are the same, the electric power supply mode may not be changed, a determination as to whether or not the second threshold value is exceeded in the currently set electric power supply mode may be made, and the supply of electric power may be stopped if the second threshold value is exceeded.

The electric power supply control unit 12 executes supply of electric power to the notebook personal computer, which is a sink device, in accordance with the 45 W mode (step ST6). Specifically, the electric power supply control unit 12 controls the power source unit 91, which has an electric power supply capacity of 60 W, so that the power source unit 91 supplies the supply electric power VBUS of 45 W (20 V, 2.25 A) to the notebook personal computer connected to the interface unit 93 and supplies electric power of 15 W to the light source unit 94 as the first electric power.

The electric power supply control unit 12 determines whether or not the current value detected by the current detection unit 16 exceeds 130% of the current value of the 45 W mode (a second threshold value current=2.25 A) (step ST7).

If the electric power supply control unit 12 has determined that the current value does not exceed 2.925 A, which is 130% of the current value of the 45 W mode (No at step ST7), the electric power supply control unit 12 continues execution of the supply of electric power to the notebook personal computer, which is a sink device, in accordance with the 45 W mode (step ST6).

In contrast, if the electric power supply control unit 12 has determined that the current value exceeds 2.925 A, which is 130% of the current value of the 45 W mod (Yes at step ST7), the electric power supply control unit 12 stops the supply of electric power (step ST8). Specifically, the electric power supply control unit 12 stops the supply of electric power to the notebook personal computer, which is a sink device.

As described above, in the flow shown in FIG. 4, the video display apparatus 100 reduces the electric power consumption of the backlight by 15 W and then changes the electric power that can be supplied by the USB Power Delivery control unit (the electric power supply control unit 12) from 30 W to 45 W. By doing so, because the electric power that can be supplied is changed to 45 W (20 V, 2.25 A), the current that can be supplied is increased and a threshold value (the second threshold value) at which control for protecting the power source is activated is also increased, and thus it is possible to maintain the supply of electric power without activating the protection function.

It is to be noted that if the electric power consumption of the backlight is reduced, images on a display unit displayed by the video display apparatus become dark. At this time, a message or the like corresponding to the fact that the brightness (the electric power consumption) of the backlight has been reduced in order to maintain the supply of electric power to the external device may be displayed using, for example, an OSD.

It is to be noted that because the electric power consumption of the light source unit (the backlight) provided in the video display apparatus frequently accounts for a large proportion of the electric power consumption of the entire video display apparatus, the present example embodiment limits the electric power supplied to the light source unit 94 if the current value detected by the current detection unit 16 reaches the predetermined first threshold value; however, the target of the limitation is not limited thereto. For example, limitations may be imposed on another component (circuit) that is provided in the video display apparatus, that consumes high electric power, and that is supplied with the first electric power and/or another external device that is connected to the video display apparatus, that consumes high electric power, and that is supplied with the first electric power.

SECOND EXAMPLE EMBODIMENT

Figure 5:
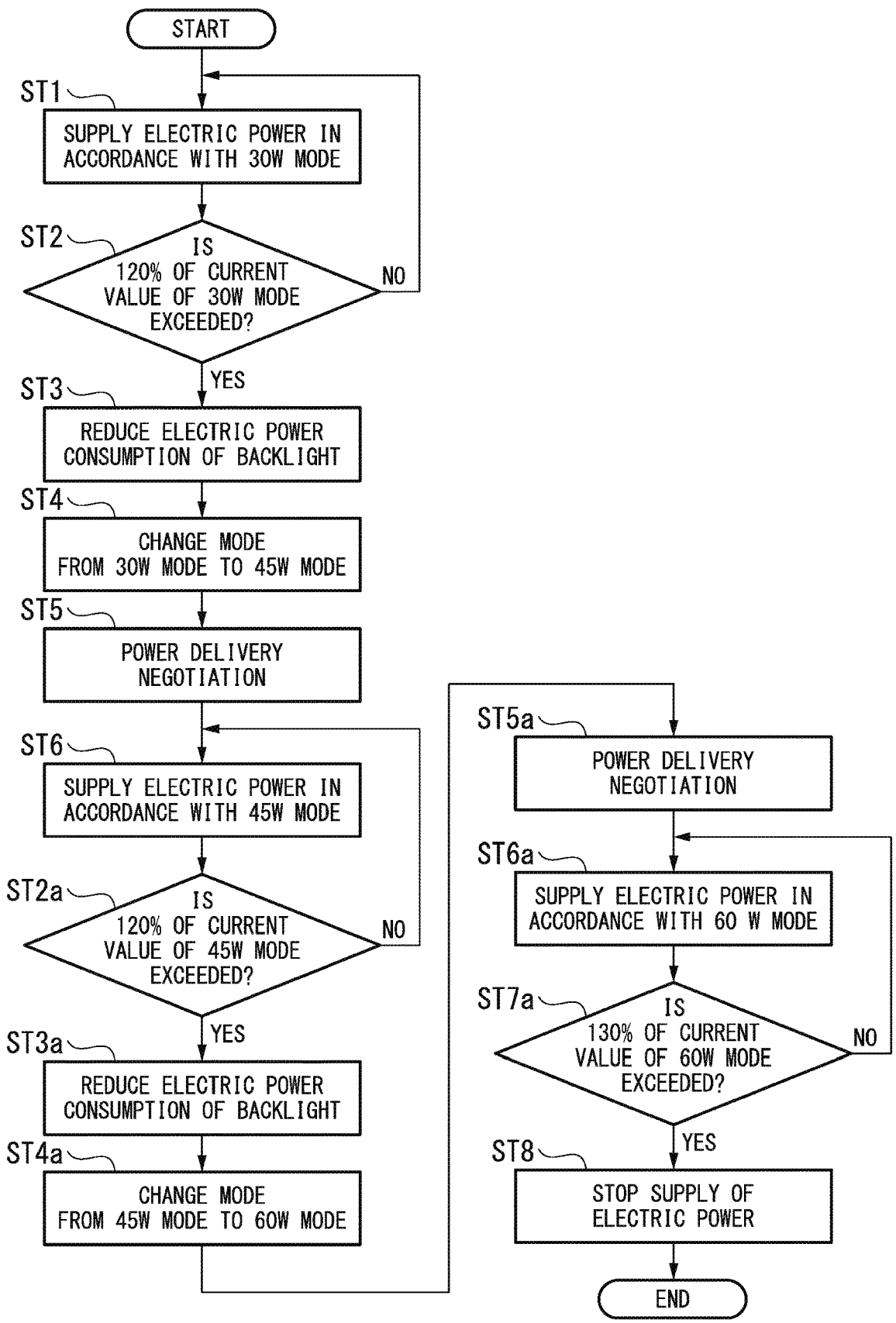
FIG. 5 is a flowchart showing another example of the operation of the video display apparatus 100 shown in FIG. 3.

In the above-described first example embodiment, the video display apparatus 100 executes a mode change between the two current supply modes, but the mode may be changed among three current supply modes as shown in FIG. 5 if the light source unit 94 can afford to further reduce the electric power. It is to be noted that the number of current supply modes may be greater than or equal to four.

That is, in the present example embodiment, the electric power supply control unit 12 is provided with the 30 W mode (the normal mode), the 45 W mode (a first backlight limitation mode), and a 60 W mode (a second backlight limitation mode) as the plurality of electric power supply modes.

FIG. 5 is a flowchart showing another example of the operation of the video display apparatus 100 shown in FIG. 3.

In FIG. 5, the same reference signs are assigned to the same parts as those of the flowchart shown in FIG. 4 and a description of steps ST1 to ST4 will be omitted.

The electric power supply control unit 12 executes negotiations relating to the Power Delivery (step ST5). Specifically, the electric power supply control unit 12 executes the second-time negotiations (re-negotiations of the first-time negotiations) with the sink device, which is an external device, and determines to change the second electric power VBUS that can be supplied from 30 W to 45 W.

Subsequently, the electric power supply control unit 12 executes the supply of electric power to the notebook personal computer, which is a sink device, in accordance with the 45 W mode (step ST6).

Subsequently, the control unit 15 determines whether or not the current value detected by the current detection unit 16 exceeds 120% of the current value of the 45 W mode (a first threshold value current=2.25 A) (step ST2a).

If the control unit 15 has determined that the current value does not exceed 2.7 A, which is 120% of the current value of the 45 W mode (the first threshold value current=2.25 A) (No at step ST2a), the electric power supply control unit 12 continues execution of the supply of electric power to the notebook personal computer, which is a sink device, in accordance with the 45 W mode (step ST6).

In contrast, if the control unit 15 has determined that the current value exceeds 2.7 A, which is 120% of the current value of the 45 W mode (Yes at step ST2a), the control unit 15 executes control that reduces the current consumption of the backlight (step ST3a). Specifically, the control unit 95 generates a backlight control signal on the basis of information indicating the first electric power to be supplied from the power source unit 91 to the light source unit 94 (electric power that is smaller than the electric power supply capacity of the power source unit 91 (electric power that is greater than 60 W) by 60 W) and outputs the backlight control signal to the light source unit 94.

It is to be noted that when the electric power supply capacity of the power source unit 91 is 60 W, the backlight may be turned off. In this case, no images are displayed on the display unit of the video display apparatus.

Subsequently, the electric power supply control unit 12 executes a change from the 45 W mode to the 60 W mode (step ST4a). Specifically, the electric power supply control unit 12 controls the power source unit 91 so that the power source unit 91 supplies the electric power that is smaller than the electric power supply capacity of the power source unit 91 by 60 W to the light source unit 94 as the first electric power and supplies 60 W to the sink device, which is an external device, as the second electric power VBUS.

Subsequently, the electric power supply control unit 12 executes Power Delivery negotiations (step ST5a). Specifically, the electric power supply control unit 12 executes the third-time negotiations (re-negotiations of the second-time negotiations) with the sink device, which is an external device, and determines to change the second electric power VBUS that can be supplied from 45 W to 60 W.

The electric power supply control unit 12 executes supply of electric power to the notebook personal computer, which is a sink device, in accordance with the 60 W mode (step ST6a).

The electric power supply control unit 12 determines whether or not the current value detected by the current detection unit 16 exceeds 130% of the current value of the 60 W mode (the second threshold value current=3 A) (step ST7).

If the electric power supply control unit 12 has determined that the current value does not exceed 3.9 A, which is 130% of the current value of the 45 W mode (No at step ST7a), the electric power supply control unit 12 continues execution the supply of electric power to the notebook personal computer, which is a sink device, in accordance with the 60 W mode (step ST6a).

In contrast, if the electric power supply control unit 12 has determined that the current value exceeds 3.9 A, which is 130% of the current value of the 60 W mode (Yes at step ST7a), the electric power supply control unit 12 stops the supply of electric power (step ST8). Specifically, the electric power supply control unit 12 stops the supply of electric power to the notebook personal computer, which is a sink device.

In this manner, in the present example embodiment, the second threshold value is determined by the last negotiations, and the first threshold value is determined a plurality of times (determined twice) so as to correspond to the number of times of negotiations except for the last negotiations among the negotiations (the three times negotiations including the twice re-negotiations).

Thus, because the electric power that can be supplied is changed to 45 W (20 V, 2.25 A) and then to 60 W (20 V, 3 A) as a result of the re-negotiations, the current that can be supplied becomes greater than that in the first example embodiment, and the threshold value (the second threshold value) at which control for protecting the power source is activated also becomes greater than that in the first example embodiment, and thus it is possible to extend the current region in which supply of electric power can be maintained without activating the protection function.

Figure 6:
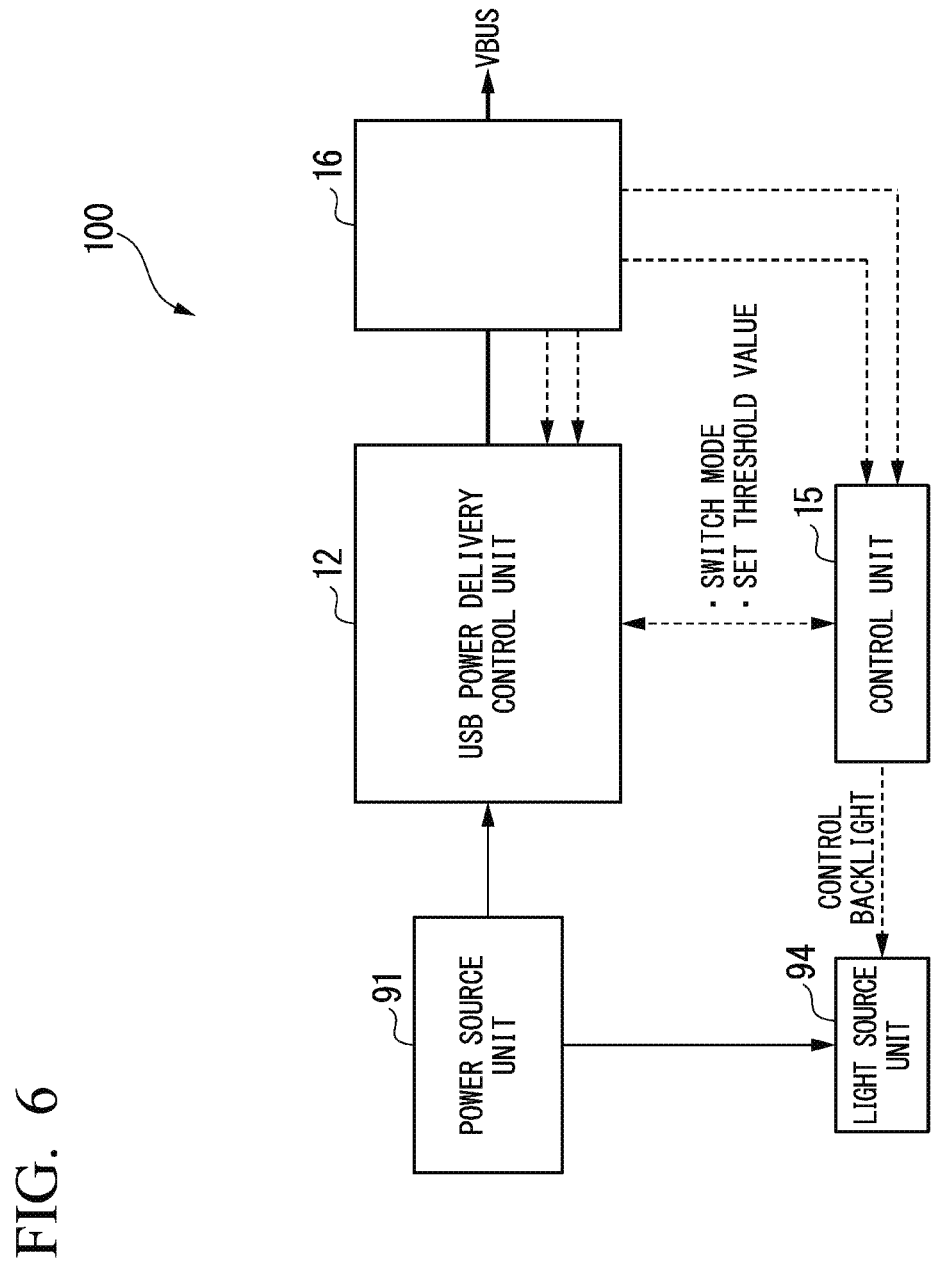
FIG. 6 is a block diagram showing an example of a basic structure of a video display apparatus in accordance with an example embodiment of the present invention.

Next, an example of a basic structure in accordance with an example embodiment of the present invention will be described with reference to FIG. 6. FIG. 6 is a block diagram showing an example of a basic structure of a video display apparatus in accordance with an example embodiment of the present invention.

A video display apparatus 100 shown in FIG. 6 is configured to include a power source unit 91, a USB Power Delivery control unit (hereinafter referred to as an electric power supply control unit) 12, a light source unit 94, a control unit 15, and a current detection unit 16.

The power source unit 91 supplies first electric power to the light source unit 94 and supplies second electric power VBUS to the sink device, which is an external device.

The current detection unit 16 detects a current value when the second electric power is supplied to the sink device.

The electric power supply control unit 12 is provided with a plurality of electric power supply modes and performs control that supplies electric power corresponding to one electric power supply mode among the plurality of electric power supply modes to the external device (the sink device) as the second electric power. Moreover, if the current value detected by the current detection unit 16 reaches a predetermined second threshold value that is greater than a predetermined first threshold value, the electric power supply control unit 12 performs control that stops the supply of the second electric power.

If the current value detected by the current detection unit 16 reaches the predetermined first threshold value, the control unit 15 performs control that limits the electric power supplied to the light source unit 94.

It is to be noted that in the example embodiments, after the electric power supply mode for the external device is set to the 30 W mode (e.g., 20 V, 1.5 A), if the supply current to the external device reaches the first threshold value, the electric power supply mode is changed to the 45 W mode (among the set electric power supply modes, a mode in which supply electric power is increased), and re-negotiations are performed; however, the change of the electric power supply mode is not limited thereto. For example, when re-negotiations are performed, if the sink device, which is an external device, performs the same request (20 V, 1.5 A) as that in the previous negotiations, the electric power supply mode may be coercively changed to the 45 W mode (among the set electric power supply modes, a mode in which supply electric power becomes greater than that by the previous request). Moreover, for example, the electric power supply mode may be changed to the 45 W mode (among the set electric power supply modes, a mode in which supply electric power becomes greater than that by the previous request) without re-negotiations. This is because the supply current has reached the first threshold value in the previous setting, and thus the electric power supply mode is set to a high electric power supply mode in advance. It is to be noted that a flag or the like indicating whether or not the supply current has reached the first threshold value may be stored. It is desirable that this flag be reset when supply from a power source to the electric power supply control unit is stopped.

Moreover, the video display apparatus may be, for example, a projector, rather than a direct-view display.

With the above minimum structure in accordance with the example embodiment of the present invention, it is possible to continue the supply of electric power to the external device without increasing the supply capacity of the power source in the power source unit 91 and also continue display of videos without stopping the supply of electric power.

It is to be noted that the present invention is not limited to the above-described example embodiments, and modifications, improvements, and so forth that can achieve the example object of the present invention are included in the present invention.

DESCRIPTION OF REFERENCE SIGNS 12, 92 . . . electric power supply control unit, 15, 95 . . . control unit, 16 . . . current detection unit, 16a . . . resistor, 91 . . . power source unit, 94 . . . light source unit, 100, 900 . . . video display apparatus

The invention claimed is:

1. A video display apparatus, comprising:
a power source that supplies first electric power and supplies second electric power that is different from the first electric power, the first electric power being supplied to the video display apparatus, the second electric power being supplied to an external device;
a current detector that detects a current value when the second electric power is supplied to the external device;
an electric power supply controller that comprises a plurality of electric power supply modes and performs control that supplies electric power corresponding to one electric power supply mode among the plurality of electric power supply modes to the external device as the second electric power; and
a controller that performs control that reduces the first electric power by a predetermined amount when the current value detected by the current detector reaches a predetermined first threshold value,
wherein, when the current value, detected by the current detector, reaches the predetermined first threshold value, the electric power supply controller performs control that changes the one electric power supply mode to another electric power supply mode in which an amount of supply of the second electric power is increased by the predetermined amount, and
wherein, when the current value detected by the current detector reaches a predetermined second threshold value, the electric power supply controller performs control that stops supply of the second electric power.

2. The video display apparatus according to claim 1, wherein the electric power supply controller performs negotiations with the external device after performing a change to the another electric power supply mode.

3. The video display apparatus according to claim 1, wherein the electric power supply controller performs negotiations with respect to the one electric power supply mode with the external device in advance prior to starting supply of the second electric power and determines a supply voltage when the second electric power is supplied.

4. The video display apparatus according to claim 3, wherein the negotiations include a process in which the electric power supply controller transmits supplying information relating to the electric power supply modes to the external device, receives supplied information relating to the electric power supply modes from the external device, and determines a supply voltage when the second electric power is supplied on a basis of the received supplied information.

5. The video display apparatus according to claim 4, wherein the supplying information comprises at least information indicating the plurality of supply voltages and the supply current values corresponding to the plurality of supply voltages that are provided for the electric power supply modes, and the supplied information comprises at least information indicating a supply voltage included in the supplying information.

6. The video display apparatus according to claim 1, wherein the electric power supply modes comprise a plurality of supply voltages and supply current values corresponding to the plurality of supply voltages when the second electric power is supplied.

7. The video display apparatus according to claim 6, wherein the predetermined first threshold value is greater than the supply current values set for the electric power supply modes.

8. The video display apparatus according to claim 1, wherein, when the current value detected by the current detector reaches a predetermined second threshold value that is greater than the predetermined first threshold value, the electric power supply controller performs control that stops supply of the second electric power.

9. The video display apparatus according to claim 8, wherein the second threshold value is determined by a last negotiation among a plurality of times of negotiations, and
wherein a number of times that the first threshold value is determined is equal to a number of times of negotiations except for the last negotiation among the plurality of times of negotiations.

10. The video display apparatus according to claim 8, wherein the second threshold value is determined by a last negotiation among a plurality of times of negotiations.

11. The video display apparatus according to claim 8, wherein a number of times that the first threshold value is determined is equal to a number of times of negotiations except for a last negotiation among a plurality of times of negotiations.

12. The video display apparatus according to claim 1, wherein the first electric power includes electric power supplied to a light source.

13. The video display apparatus according to claim 1, wherein the second threshold value is determined by a last negotiation among a plurality of times of negotiations, and
wherein a number of times that the first threshold value is determined is equal to a number of times of negotiations except for the last negotiation among the plurality of times of negotiations.

14. The video display apparatus according to claim 1, wherein the controller performs the control that reduces the first electric power by the predetermined amount according to the current value being detected by the current detector reaching the predetermined first threshold value,
wherein, according to the current value, detected by the current detector, reaching the predetermined first threshold value, the electric power supply controller performs the control that changes the one electric power supply mode to the another electric power supply mode in which the amount of supply of the second electric power is increased by the predetermined amount.

15. The video display apparatus according to claim 1, wherein according to the current value detected by the current detector reaching the predetermined first threshold value, the first electric power is reduced by the predetermined amount, and the second electric power is increased by the predetermined amount.

16. A method for supplying electric power of a video display apparatus that comprises a power source that supplies first electric power and supplies second electric power that is different from the first electric power, the first electric power being supplied to the video display apparatus, the second electric power being supplied to an external device, the method comprising:
    providing a plurality of electric power supply modes and supplying electric power corresponding to one electric power supply mode among the plurality of electric power supply modes to the external device as the second electric power;
    detecting a current value from the second electric power being supplied to the external device; and
    performing control that reduces the first electric power by a predetermined amount according to the detected current value reaching a predetermined first threshold value,
    wherein, according to the detected current value reaching the predetermined first threshold value, the control is performed to change the one electric power supply mode to another electric power supply mode in which an amount of supply of the second electric power is increased by the predetermined amount,
    wherein, when the detected current value reaches a predetermined second threshold value that is greater than the predetermined first threshold value, the control is performed to stop supply of the second electric power, and
    wherein a number of times that the first threshold value is determined is equal to a number of times of negotiations except for a last negotiation among a plurality of times of negotiations.

17. The method according to claim 16, wherein the second threshold value is determined by a last negotiation among a plurality of times of negotiations, and
    wherein a number of times that the first threshold value is determined is equal to a number of times of negotiations except for the last negotiation among the plurality of times of negotiations.

18. The method according to claim 16, wherein the second threshold value is determined by a last negotiation among a plurality of times of negotiations.

* * * * *